US010051072B2

(12) United States Patent
Bunner et al.

(10) Patent No.: US 10,051,072 B2
(45) Date of Patent: Aug. 14, 2018

(54) DETECTING CO-PRESENCE IN THE PHYSICAL WORLD

(71) Applicant: Google Inc., Mountain View, CA (US)

(72) Inventors: Andrew Ames Bunner, Belmont, CA (US); Frank Petterson, Redwood City, CA (US)

(73) Assignee: Google LLC, Mountain View, CA (US)

( * ) Notice: Subject to any disclaimer, the term of this patent is extended or adjusted under 35 U.S.C. 154(b) by 364 days.

(21) Appl. No.: 13/924,114

(22) Filed: Jun. 21, 2013

(65) Prior Publication Data

US 2014/0379798 A1    Dec. 25, 2014

(51) Int. Cl.
| | |
|---|---|
| *G06F 15/16* | (2006.01) |
| *H04L 29/08* | (2006.01) |
| *G06Q 50/00* | (2012.01) |
| *H04L 12/58* | (2006.01) |

(52) U.S. Cl.
CPC ............. *H04L 67/24* (2013.01); *G06Q 50/01* (2013.01); *H04L 51/32* (2013.01); *H04L 51/36* (2013.01)

(58) Field of Classification Search
CPC .......... G06Q 50/01; H04L 67/22; H04L 51/32
See application file for complete search history.

(56) References Cited

U.S. PATENT DOCUMENTS

| | | | | |
|---|---|---|---|---|
| 8,693,689 | B2 * | 4/2014 | Belenkiy | ............... H04L 9/0872 380/270 |
| 2004/0077352 | A1 | 4/2004 | Mahany | |
| 2007/0019616 | A1 | 1/2007 | Rantapuska et al. | |
| 2008/0243853 | A1 * | 10/2008 | Reding | .................... H04L 51/32 |
| 2008/0275891 | A1 * | 11/2008 | Park | .................. G06F 17/30533 |
| 2009/0157731 | A1 * | 6/2009 | Zigler | ............... G06F 17/30749 |
| 2009/0234910 | A1 | 9/2009 | Chung et al. | |
| 2010/0199098 | A1 * | 8/2010 | King | ................... G06F 21/6254 713/182 |

(Continued)

FOREIGN PATENT DOCUMENTS

| | | |
|---|---|---|
| AU | 2013200513 B1 | 4/2013 |
| EP | 2595109 A1 | 5/2013 |

OTHER PUBLICATIONS

International Bureau of WIPO, International Preliminary Report on Patentability for International Patent Application No. PCT/US2014/042644, dated Jan. 12, 2016, 6 pages.

(Continued)

*Primary Examiner* — Dhairya A Patel
(74) *Attorney, Agent, or Firm* — IP Spring

(57) ABSTRACT

Implementations generally relate to increasing engagement among users in a social network system. In some implementations, a method includes determining at least one social activity associated with an initiator user in a social network system. The method also includes enabling a token to be sent from an initiator device to one or more nearby devices, wherein the initiator device is associated with the initiator user, and wherein the one or more nearby devices are associated with one or more nearby users. The method also includes sending one or more invitations to one or more of the nearby users in association with the token. The method also includes performing one or more predetermined actions in association with the one or more nearby users based on one or more responses to the invitations.

20 Claims, 4 Drawing Sheets

(56) References Cited

U.S. PATENT DOCUMENTS

| | | | |
|---|---|---|---|
| 2011/0086593 A1* | 4/2011 | Hardacker | H04M 1/7253 |
| | | | 455/41.3 |
| 2011/0238755 A1 | 9/2011 | Khan | |
| 2012/0130794 A1* | 5/2012 | Strieder | G06Q 30/02 |
| | | | 705/14.27 |
| 2012/0197709 A1* | 8/2012 | Kendall | G06Q 30/0207 |
| | | | 705/14.36 |
| 2012/0197806 A1* | 8/2012 | Hill | G06F 21/35 |
| | | | 705/67 |
| 2012/0253817 A1* | 10/2012 | Trinh | H04M 3/4935 |
| | | | 704/270 |
| 2013/0066963 A1 | 3/2013 | Odio | |
| 2013/0079037 A1 | 3/2013 | Dobyns | |
| 2013/0091359 A1 | 4/2013 | Guo et al. | |
| 2013/0104221 A1* | 4/2013 | Low | H04W 4/08 |
| | | | 726/9 |
| 2013/0159112 A1* | 6/2013 | Schultz | G06Q 30/02 |
| | | | 705/14.66 |
| 2013/0191394 A1* | 7/2013 | Bradley | G06F 17/30598 |
| | | | 707/738 |
| 2013/0326375 A1* | 12/2013 | Barak | H04L 65/403 |
| | | | 715/758 |
| 2014/0006517 A1* | 1/2014 | Hsiao | G06O 50/01 |
| | | | 709/205 |
| 2014/0172980 A1* | 6/2014 | Russell | G06Q 10/10 |
| | | | 709/204 |
| 2014/0188899 A1* | 7/2014 | Whitnah | G06F 17/30646 |
| | | | 707/749 |

OTHER PUBLICATIONS

USPTO, International Search Report for International Patent Application No. PCT/U82014/042644, dated December 21, 2015, 2 pages.

USPTO, Written Opinion for International Patent Application No. PCT/U82014/042644, dated December 21, 2015, 5 pages.

* cited by examiner

400

DETECTING CO-PRESENCE IN THE PHYSICAL WORLD

BACKGROUND

Some mobile applications enable users to participate in social activities where users can grant access to other users who are physically close by. For example, a group of friends may have taken some photos of each other and may want to share the photos with each other. Such social interaction, however, is a manual process that requires much time to take the necessary actions to set up.

SUMMARY

Implementations generally relate to increasing engagement among users in a social network system. In some implementations, a method includes determining at least one social activity associated with an initiator user in a social network system. The method also includes enabling a token to be sent from an initiator device to one or more nearby devices, where the initiator device is associated with the initiator user, and where the one or more nearby devices are associated with one or more nearby users. The method also includes sending one or more invitations to one or more of the nearby users in association with the token. The method also includes performing one or more predetermined actions in association with the one or more nearby users based on one or more responses to the invitations.

With further regard to the method, in some implementations, at least one social activity includes the initiator user checking in to a location. In some implementations, at least one social activity includes the initiator inviting nearby users to a group chat inside a messaging application. In some implementations, where the enabling includes: generating the token; and sending the token to the initiator device, where the token is broadcast to the nearby devices. In some implementations, the enabling includes enabling the token to be broadcast to the nearby devices based on sound. In some implementations, the enabling includes enabling the token to be broadcast to the nearby devices based on a data-over-audio process. In some implementations, the enabling includes enabling the token to be broadcast to the nearby devices based on direct-sequence spread spectrum modulation. In some implementations, the one or more invitations include information associated with at least one social activity. In some implementations, the sending of the one or more invitations is in response to the one or more nearby devices having received the token and having requested token details. In some implementations, the one or more predetermined actions include sharing one or more media items with the one or more nearby users. In some implementations, the one or more predetermined actions include generating one or more social connections in a social graph between the initiator user and one or more of the nearby users. In some implementations, the initiator device and the nearby devices are mobile devices In some implementations, a method includes determining at least one social activity associated with an initiator user in a social network system, where at least one social activity includes the initiator user checking in to a location. The method also includes enabling a token to be sent from an initiator device to one or more nearby devices, where the initiator device is associated with the initiator user, and where the one or more nearby devices are associated with one or more nearby users, where the enabling includes generating the token and sending the token to the initiator device, and where the token is broadcast to the nearby devices. The method also includes sending one or more invitations to one or more of the nearby users in association with the token, where the sending of the one or more invitations is in response to the one or more nearby devices having received the token and having requested token details, and where the one or more invitations include information associated with at least one social activity. The method also includes performing one or more predetermined actions in association with the one or more nearby users based on one or more responses to the invitations.

In some implementations, a system includes one or more processors, and logic encoded in one or more tangible media for execution by the one or more processors. When executed, the logic is operable to perform operations including: determining at least one social activity associated with an initiator user in a social network system; enabling a token to be sent from an initiator device to one or more nearby devices, where the initiator device is associated with the initiator user, and where the one or more nearby devices are associated with one or more nearby users; sending one or more invitations to one or more of the nearby users in association with the token; and performing one or more predetermined actions in association with the one or more nearby users based on one or more responses to the invitations.

With further regard to the system, in some implementations, at least one social activity includes the initiator user checking in to a location. In some implementations, to enable a token to be sent, the logic when executed is further operable to perform operations including: generating the token; and sending the token to the initiator device, where the token is broadcast to the nearby devices. In some implementations, to enable a token to be sent, the logic when executed is further operable to perform operations including enabling the token to be broadcast to the nearby devices based on sound. In some implementations, to enable a token to be sent, the logic when executed is further operable to perform operations including enabling the token to be broadcast to the nearby devices based on a data-over-audio process. In some implementations, the enabling includes enabling the token to be broadcast to the nearby devices based on direct-sequence spread spectrum modulation. In some implementations, the one or more invitations include information associated with at least one social activity. In some implementations, the sending of the one or more invitations is in response to the one or more nearby devices having received the token and having requested token details. In some implementations, the one or more predetermined actions include sharing one or more media items with the one or more nearby users.

DETAILED DESCRIPTION

Implementations described herein increase engagement among users in a social network system. As described in more detail below, the server of a social network system determines social activity associated with an initiator user in the social network system. The social activity may include the initiator user checking in to a location, for example. In various implementations, the server enables a token to be sent from an initiator device of the initiator user to one or more nearby devices of respective nearby users. For example, in various implementations, to enable the sending of the token, the server generates the token, sends the token to the initiator device, which in turn broadcasts the token to the nearby devices.

In various implementations, the server sends the invitations to the nearby users in association with the token. For example, the server may send the invitations in response to the nearby devices having received the token and having requested token details. In various implementations, the one or more invitations include information associated with at least one social activity. The server then performs one or more predetermined actions in association with the one or more nearby users based on one or more responses to the invitations. For example, the predetermined actions may include sharing one or more media items with the nearby users, and may also include generating one or more social connections in a social graph between the initiator user and one or more of the nearby users.

Figure 1:
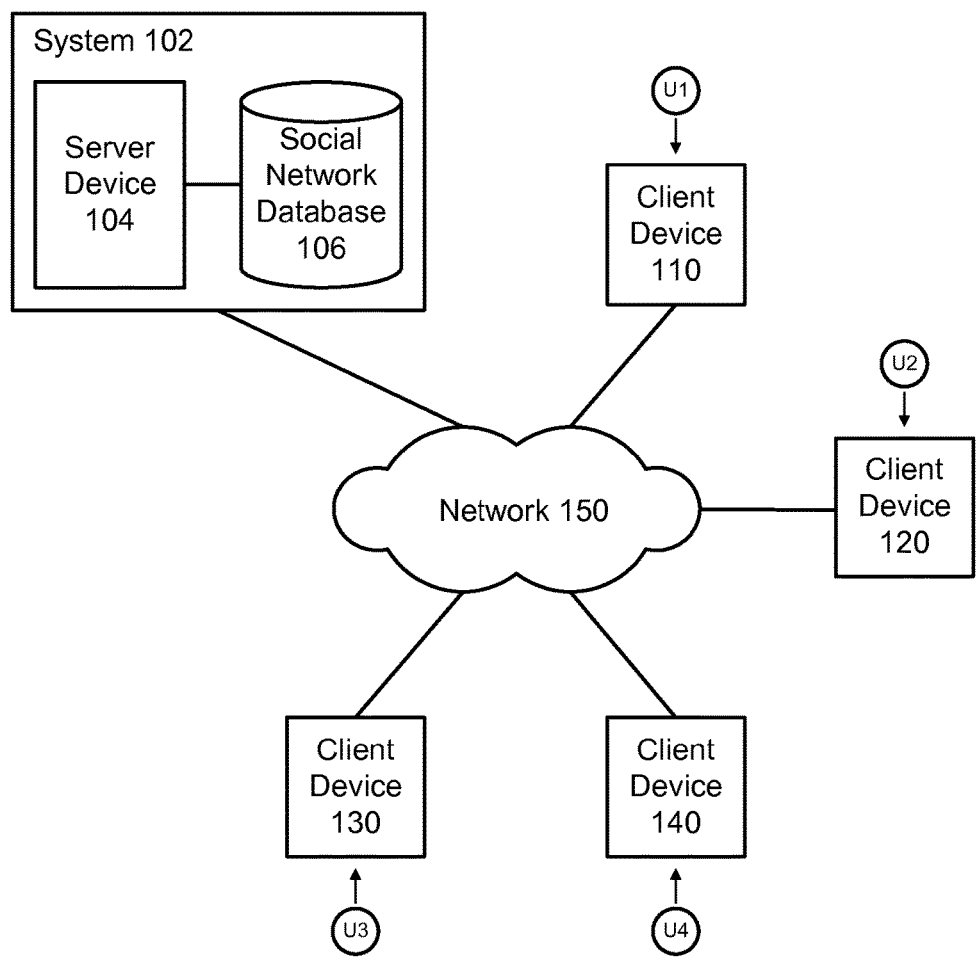
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. As described in more detail below, users U1, U2, U3, and U4 may interact with each other in an ad-hoc event. For example, an initiator user (e.g., user U1) may initiate an ad-hoc event (e.g., sharing photos) and invite nearby users (e.g., users U2, U3, and U4) to participate in the event (e.g., receiving photos). Implementations facilitate the users in participating in such ad-hoc events.

In the various implementations described herein, processor 102 of system 102 causes the elements described herein (e.g., invitations, even information, user information, etc.) to be displayed in a user interface on a display screen.

Figure 2:
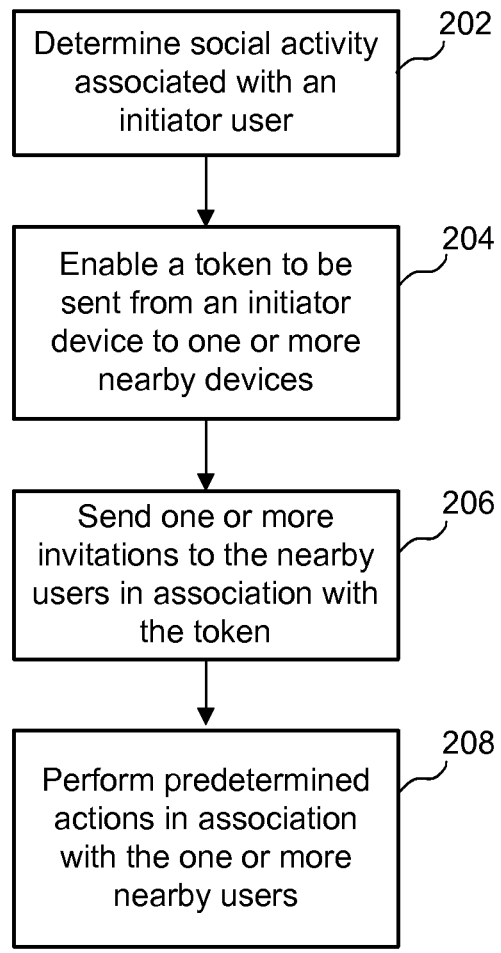
FIG. 2 illustrates an example simplified flow diagram for increasing user engagement in a social network system, according to some implementations.

FIG. 2 illustrates an example simplified flow diagram for increasing engagement among users in a social network system, according to some implementations. Referring to both FIGS. 1 and 2, a method is initiated in block 202, where system 102 determines at least one social activity associated with an initiator user in the social network system.

In some implementations, the social activity may include the initiator user checking in to a location. In some implementations, the social activity may include the initiator user initiating the sharing of one or more posts or media items with a group of nearby people/users (e.g., friends sharing photos that were just taken). In some implementations, the social activity may include the initiator user creating an ad-hoc event with the nearby users as invitees. In some implementations, the social activity may include the initiator user creating links/social connections in an online social graph between the initiator user and nearby users. In some implementations, the social activity may include the initiator user inviting people to any type of conversation such as a multi-user conversation or chat, multi-user video conference, etc. In some implementations, the social activity may include the initiator user inviting people to an existing conversation.

As described in more detail below in connection with FIG. 3, the social activity may trigger the initiator device of the initiator user to request a token from system 102.

In block 204, system 102 enables a token to be sent from an initiator device to one or more nearby devices, where the initiator device is associated with the initiator user, and where the one or more nearby devices are associated with one or more nearby users.

In some implementations, to enable the token to be sent from an initiator device to the nearby devices, system 102 generates the token. In various implementations, system 102 generates a random token. System 102 then sends the token to the initiator device. The initiator device then broadcasts the token to the nearby devices. In some implementations, the initiator device may generate the token and then broadcast the token to nearby devices. Most mobile devices have a speaker and microphone. As such, the required hardware for the communication protocol is ensured to be available on most mobile devices. In various scenarios, sound is advantageous, because sound is a one-to-many broadcasting technique, unlike one-to-one techniques such as near-field communication (NFC) techniques. Another reason sound is advantageous is that it propagates the same way human speech propagates. For example, sound is stopped by walls and closed windows. Accordingly, if someone is in range of the token broadcast and can hear it, they would be very close. Similarly, in a space where there are many people (e.g., in a crowded bar, restaurant, etc.), one might not hear a conversation 10 feet away due to many bodies being in the way, which allows for some privacy (e.g., at a table). In various implementations, the broadcast signal is as hard/easy to pick up as the words in a conversation. It is almost as private as talking. This is a significant benefit over other mechanisms (e.g., Bluetooth, Wi-Fi, etc.) that send signals through walls, ceilings, floors, bodies, etc.

In some implementations, the token is broadcast to the nearby devices based on sound. In some implementations, the token is broadcast to the nearby devices based on a data-over-audio process. By using sound, only nearby users who are very physically close to the initiator can be a part of the social activity. In various implementations, the sound does not travel through walls. As such, even two rooms that are adjacent can simultaneously participate in separate social actions.

In some implementations, using sound also enables devices from various types of platforms and operating systems to participate in the protocol together and interoperate.

In some implementations, the token is broadcast to the nearby devices based on direct-sequence spread spectrum modulation. In some implementations, the data is encoded using a direct-sequence spread spectrum approach, which may be similar to techniques used by global positioning system (GPS) satellites. In some implementations, error correction may be employed on top of the base encoding/decoding (e.g., Reed-Solomon).

In some implementations, the token expires after a predetermined time period. For example, the token may expire after M minutes, H hours, etc. If the token has expired, the nearby devices can take no further action in association with the token. The use of an expiring token addresses various security concerns and ensures that the users who are matched to the initiator user on the server-side were almost certainly physically present and very close to the initiator user.

In block 206, system 102 sends one or more invitations to one or more of the nearby users in association with the token. In some implementations, the sending of the one or more invitations by system 102 is in response to the one or more nearby devices having received the token and having requested token details. In some implementations, system 102 includes in the invitations information associated with at least one social activity, which may include the identity of the initiator user. In some implementations, nearby users with devices that can detect or "hear" the token are considered "invited" to the activity/event. In some implementations, the invitations invite the one or more nearby users to join the one or more social activities.

In various implementations, system 102 may determine a particular user to be a nearby user based on that user being located within a predetermined distance from the initiator user. In various implementations, the predetermined distance may be based on the user being within a range (e.g., several feet or more away) to receive a broadcast token from the initiator user. The range may vary and will depend on the technology or methods used to transmit the token to the nearby users.

Various implementations directed to sending invitations in associated with the token are described in more detail below in connection with FIG. 3.

In block 208, system 102 performs one or more predetermined actions in association with the one or more nearby users based on one or more responses to the invitations. In some implementations, the one or more predetermined actions may include sharing one or more media items with the one or more nearby users. In some implementations, the one or more predetermined actions include generating one or more social connections in a social graph between the initiator user and one or more of the nearby users. As described in more detail below in connection with FIG. 3, in some implementations, system 102 enables the initiator user to accept or reject each acceptance indication.

Figure 3:
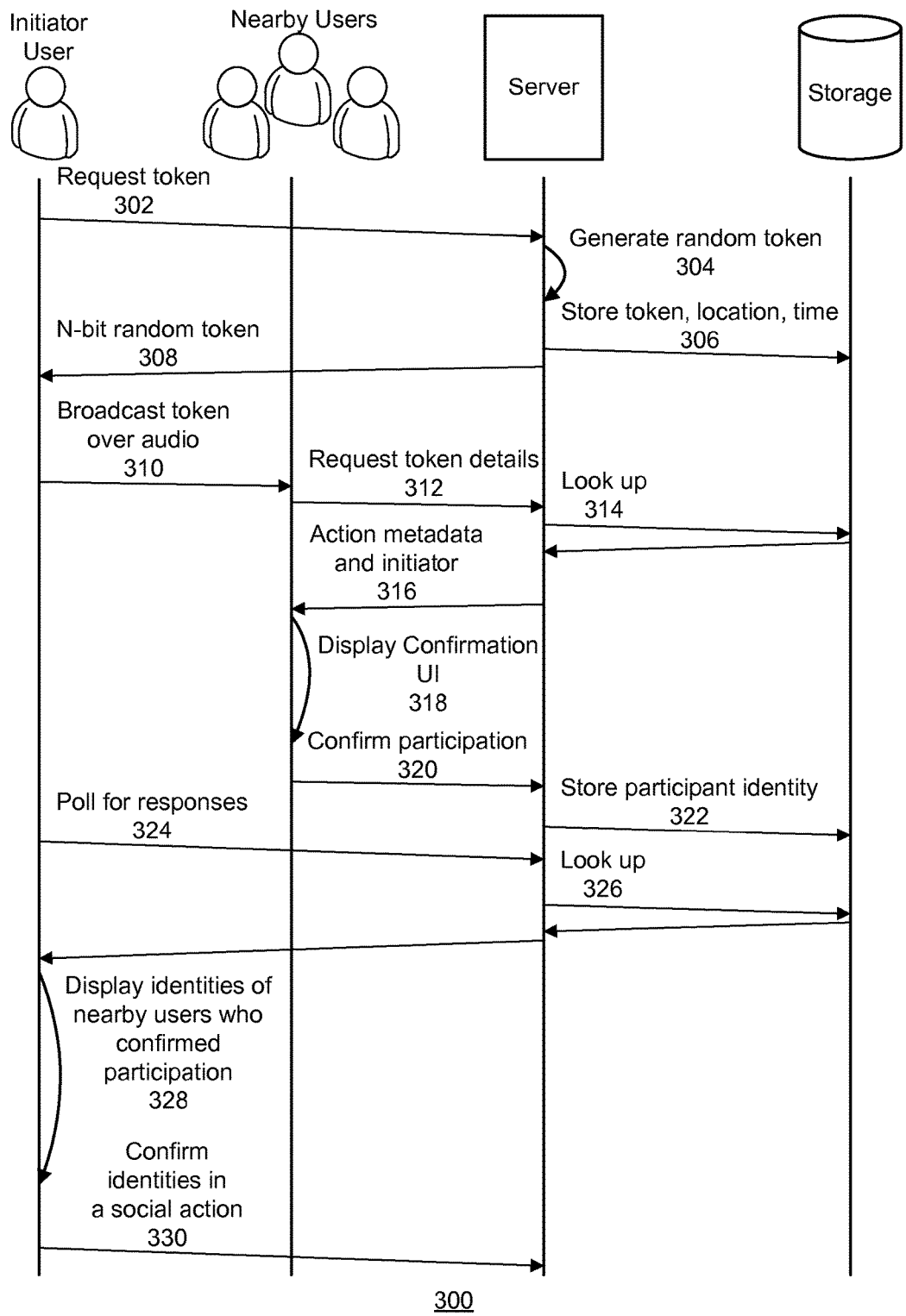
FIG. 3 illustrates an example simplified flow diagram for increasing user engagement in a social network system, according to some implementations.

FIG. 3 illustrates an example flow diagram for increasing engagement among users in a social network system, according to some implementations. The following implementations are directed to an example scenario where an ad-hoc event is created.

Referring to both FIGS. 1 and 3, at 302, one or more actions by the initiator user causes the initiator device of the initiator user to request a token. For example, the initiator user may select a button, such as "Create ad-hoc event." In another example, the initiator user may check in to a location. Any of these user actions, and others, may cause the initiator device of the initiator user to request the token. In some implementations, the initiator may invite nearby users to a group chat inside a messaging application.

In some implementations, the initiator device sends the token request to the sever, where the token request may include a coarse location, action metadata, the identity of initiator user, etc. to the server. The action metadata may include information about the action. For example, the action may be the initiator user initiating a process for creating an ad-hoc event, sharing photos or other media item(s), making a connection request, etc.

At 304, the server generates an N-bit random token upon receiving the token request from the action initiator. At 306, the server stores a tuple key (e.g., <token, location, time, etc.> that may include the token, the location of the initiator user (more precisely, the initiator device), the time of the activity (e.g., the time that the activity was created). These are some example items of information that the server may include in the tuple key. Other items of information are possible, depending on the implementation. For example, the tuple key may also include the identity of the action initiator, metadata about the action itself (e.g., "Andrew is creating an ad-hoc event called 'dinner party'"), etc. In some implementations, the server may use the tuple key in an index. In some implementations, the server may also associate the following values with the tuple key: the initiator user; the action/activity (e.g., "Create event," etc.); the identities of all responding nearby users; data payload sent by the nearby users (e.g., "Yes, I'm going," etc.). The tuple key and/or token may expire after M minutes. In some implementations, additional signals such as Wi-Fi base station detected signals and signal strength may also be stored along with the tuple key and used to establish confidence that two users are co-present or used to disambiguate two social actions that have the same N-bit token.

In some implementations, the server stores this information in a storage location. Note that server device 104 and social network database 106 of FIG. 1 may be used to implement server and storage of FIG. 3.

In various implementations, example activities may include: creating an event, trying to share a photo (which may include the thumbnail of the photo), offering to add other users to a social group, inviting other users to vote in a poll, etc.

At 308, the server sends the token to the initiator device.

At 310, the initiator device broadcasts token to nearby devices of nearby users. As indicated above, the initiator device may broadcast the token to the nearby devices based on sound, based on a data-over-audio process, and/or based on direct-sequence spread spectrum modulation.

At 312, the nearby users that receive the token send a request for token details to the server. In various implementations, each of the nearby devices detects the token using its microphone and then decodes the token. Generally, in various scenarios, the nearby users will want to know what the activity is and who initiated the activity.

At 314, the server looks up the token details from storage.

At 316, the server then sends an invitation to the nearby devices. In various implementations, the invitation includes the requested token details, which may include the location of the initiator user, the time of the activity, identity of action initiator, metadata about the action, etc. As described herein, the invitations invite the nearby users to join/participate in the social activity.

At 318, each nearby device may display a user interface (UI) to its respective user/nearby user. In some implementations, the UI may be a confirmation UI that displays one or more prompts (e.g., "Join Andrew's dinner party event," etc.).

At 320, each nearby user may select an appropriate selection (e.g., "Join"), which causes the respective device/nearby device to send a confirmation indication that confirms participation to the server. In various implementations, the confirmation indication also includes the participant identity (e.g., identity of the nearby user).

In some implementations, the identity of a given nearby user may include a unique identifier for that user (e.g., a 64-bit unique identifier). In some implementations, the confirmation may also include an indication that the respective nearby user replied "yes" to the invitation. As indicated herein, the event may include sharing one or more media items, creating a social connection in a social graph, participation in a poll. As such, the confirmation indication may include an indication that the respective nearby user replied "yes" to receiving one or more photos or other media items. The confirmation indication may include an indication that the respective nearby user replied "yes" to joining a social group in a social graph. The confirmation indication may include an indication that the respective nearby user replied "yes" to taking a poll, and may include votes and/or other response to the poll.

At 322, the server stores the participant's identity with the tuple key associated with the action.

At 324, the initiator device polls for responses. In an example scenario, the initiator user and the nearby users may be a group of people (e.g., friends) standing around trying to pick a restaurant. The initiator user may create a poll with four choices and requests a token for this poll according to the implementations described herein. As indicated above, the initiator user's identity and the four choices are stored on the server associated with the token. Then, when the nearby users respond to the poll, their choices in the poll are stored with the token as well. In some implementations, the server may push the results information (e.g., poll results) to the initiator device.

At 326, the server looks up information (e.g., poll results) associated with the confirmation indications, and then sends the information to the initiator device.

At 328, the initiator device displays to the initiator user the information including the identities of the nearby users who confirmed participation. The initiator user can then view the identities of users confirming participation, and then use the identities for the desired action/activity.

At 330, the initiator user may confirm identities of the nearby users, and the initiator device may send a confirmation indication to the server. In some implementations, the initiator user sees nearby users as they join (e.g., in a UI) and can make a selection (e.g., tap "create event," etc.) when the desired nearby users have responded. The server enables the initiator user to remove interlopers who were not meant to be part of the group but who heard the token and responded (e.g., using the UI).

As indicated above, although the description has been described with respect to particular embodiments thereof, these particular embodiments are merely illustrative, and not restrictive. For example, in some implementations, all of the data associated with a social action may be communicated entirely over audio. As such, instead of an N-bit token, the audio signal may encode, "User ID 1234 is inviting you to a group chat." In some implementations, the receiving/nearby users may respond over audio instead of data. For example, referring to arrow 320 of FIG. 3, the confirmation indication from the nearby users may be an audio broadcast back to the initiator user. This eliminates the need for storage of the confirmation indication, etc. If a high enough bit rate over audio can be achieved, much more data can be broadcast, at least enough data such that the server could be used simply to confirm identities.

In some implementations, the receiving/nearby devices may broadcast a random ID back to the initiator device such the initiator device can hear how many people are present and running software that can receive the tokens. In this way, the initiator device could display to the initiator user that, for example, "1 person is ready to be invited" or "0 people found, ask your friends to launch the application on their phones," etc. In other words, as soon as the application starts on a given device, the application may broadcast a "<random id> is present" signal outside the audible range so that the initiator user could see "Okay, someone has their phone out and is listening, now I can broadcast," for example.

In some implementations, the server may perform the audio processing. As such, the initiator device, instead of receiving a token, receives an audio signal to play over the speaker of the initiator device. The receiving/nearby devices, instead of decoding that audio signal, simply pass the entire audio buffer back to the server for interpretation (e.g., to ask the server "what does this mean?"). This implementation is another mechanism for accomplishing the co-presence detection using materially the same technology but pushing the processing to the server. This has an advantage that the encoding and decoding technology can be updated independent of the software on the mobile devices since the mobile/nearby devices are not doing any encoding/decoding. The nearby devices are simply playing and recording.

Other applications of the implementations described herein are possible. For example, in one example scenario, when a user physically enters a store/business, the business can initiate implementations described above to broadcast a token associated with the social action "check in to my restaurant." This would encourage social interaction between consumer users and business users.

In another example application, implementations may be used to pair devices where one device is "owned" by a user (e.g., a phone) and the other/nearby device is a fixture (e.g., a television, video conferencing unit, point-of-sale device, electronic door lock, etc.). For example, in some implementations, the user can use his or her device as a remote for a television, or a video conferencing unit.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Implementations described herein provide various benefits. For example, implementations enable quick and convenient ad-hoc events amount users in a social network system. Implementations enable users to share media items, take polls, etc. By sending small bits of information over the audio spectrum, implementations provide a social context to mobile devices with regard to who is physically nearby a given user. Implementations described herein also increase overall engagement among users in a social network environment.

Figure 4:
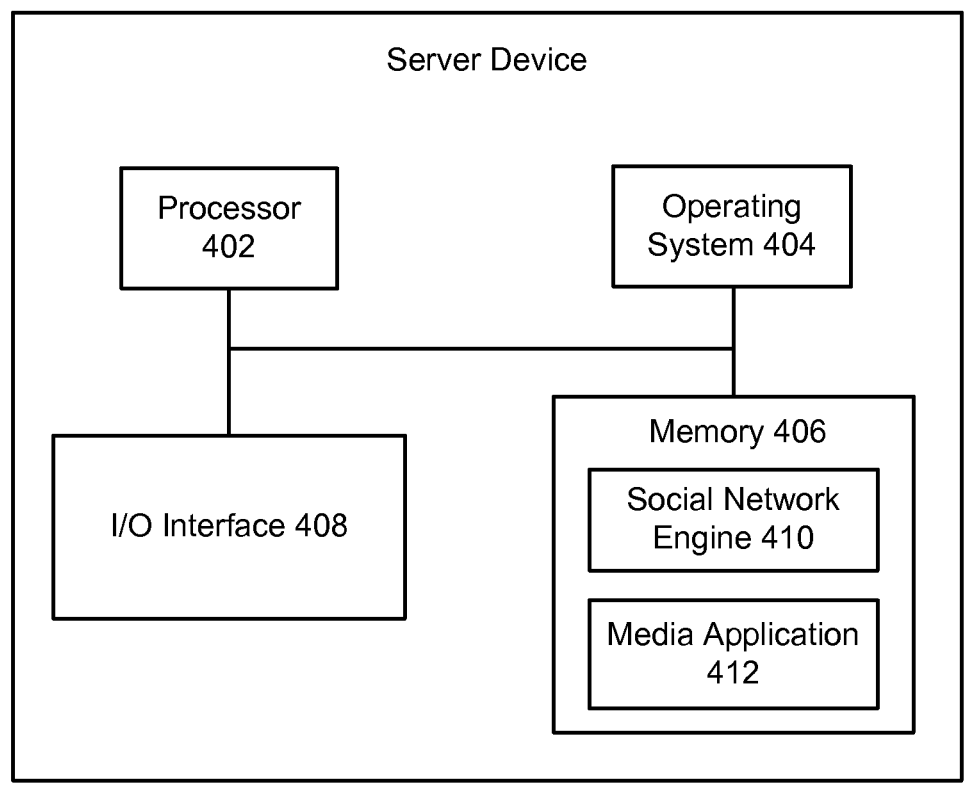
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

As indicated above, although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
    receiving, by an initiator device, at least one social activity associated with an initiator user in a social network system, wherein the at least one social activity includes transmitting an invitation to one or more users to a group chat inside a messaging application;
    providing, to a server, a request for a token, wherein the request includes a location of the initiator device and a time of the at least one social activity;
    receiving, from the server, the token, wherein the server stores a tuple that includes the token, the location of the initiator device, metadata about the at least one social activity, and the time of the at least one social activity;
    broadcasting, by the initiator device, the token based on a data-over-audio process to one or more nearby devices, wherein the one or more nearby devices are associated with the one or more users, the one or more nearby devices detect audio from the data-over-audio process using one or more microphones, and the token expires after a predetermined amount of time; and
    receiving, from the server, identities of the one or more users associated with the one or more nearby devices that received the token, wherein the server updates the tuple to include the identities of the one or more users associated with the one or more nearby devices that received the token.

2. A computer-implemented method comprising:
    determining, by one or more processors, at least one social activity associated with an initiator user in a social network system, wherein the at least one social activity includes a request from the initiator user to invite one or more users to a group chat inside a messaging application associated with an initiator device of the initiator user;
    receiving, from the initiator device, a request for a token, wherein the request for the token includes a location of the initiator device and a time of the at least one social activity;
    storing a tuple that includes the token, the location of the initiator device, metadata about the at least one social activity, and the time of the at least one social activity;
    enabling the token to be sent from the initiator device, wherein the initiator device broadcasts the token based on a data-over-audio process to one or more nearby devices, the initiator device is associated with the initiator user, the one or more nearby devices are associated with one or more users, the one or more nearby devices detect audio from the data-over-audio process using one or more microphones, and the one or more nearby devices request token details that include the metadata about the at least one social activity;
    sending one or more invitations to the one or more of the users in association with the token;
    updating the tuple to include identities of the one or more users associated with the one or more nearby devices that received the token; and
    performing one or more predetermined actions in association with the one or more users based on one or more responses to the invitations.

3. The method of claim 2, wherein the at least one social activity further includes the initiator user checking in to the location using the initiator device.

4. The method of claim 2, wherein the token is encoded to include, as part of the one or more invitations, an identity of the initiator user that provided the request to invite the one or more users to the group chat.

5. The method of claim 2, further comprising:
generating the token; and
sending the token to the initiator device.

6. The method of claim 2, wherein the tuple further includes an identity of the initiator user of the at least one social activity.

7. The method of claim 2, wherein the token is configured to expire after a predetermined amount of time.

8. The method of claim 2, wherein the initiator device broadcasts the token to the one or more nearby devices based on direct-sequence spread spectrum modulation.

9. The method of claim 2, wherein the one or more invitations include information associated with the at least one social activity.

10. The method of claim 2, wherein the sending of the one or more invitations is in response to the one or more nearby devices having received the token and having requested token details.

11. The method of claim 2, wherein the one or more predetermined actions comprise sharing one or more media items with the one or more users.

12. The method of claim 2, wherein the one or more predetermined actions comprise generating one or more social connections in a social graph between the initiator user and one or more of the users.

13. The method of claim 2, wherein the initiator device and the one or more nearby devices are mobile devices.

14. A system comprising:
one or more processors; and
logic encoded in one or more tangible media for execution by the one or more processors and when executed operable to perform operations comprising:
determining at least one social activity associated with an initiator user in a social network system, wherein the at least one social activity includes a request from an initiator device of the initiator user to invite one or more users to a group chat;
receiving, from the initiator device, a request for a token, wherein the request for the token includes a location of the initiator device and a time of the at least one social activity;
storing a tuple that includes the token, the location of the initiator device, metadata about the at least one social activity, and the time of the at least one social activity;
enabling the token to be sent from the initiator device, wherein the initiator device broadcasts the token based on a data-over-audio process to one or more nearby devices, wherein the initiator device is associated with the initiator user, the one or more nearby devices are associated with one or more users, the one or more nearby devices detect audio from the data-over-audio process using one or more microphones, and the one or more nearby devices request token details that include the metadata about the at least one social activity;
sending one or more invitations to the one or more users in association with the token;
updating the tuple to include identities of the one or more users associated with the one or more nearby devices that received the token; and
performing one or more predetermined actions in association with the one or more users based on one or more responses to the invitations.

15. The system of claim 14, wherein the at least one social activity further includes the initiator user checking in to the location.

16. The system of claim 14, wherein, to enable the token to be sent, the logic when executed is further operable to perform operations comprising:
generating the token; and
sending the token to the initiator device.

17. The system of claim 14, wherein the tuple is associated with a Wi-Fi base station detected signal and a signal strength of the Wi-Fi base station detected signal.

18. The system of claim 14, wherein the token is configured to expire after a predetermined amount of time.

19. The system of claim 14, wherein the enabling comprises enabling the token to be broadcast to the one or more nearby devices based on direct-sequence spread spectrum modulation.

20. The system of claim 14, wherein the one or more invitations include information associated with the at least one social activity.

* * * * *